United States Patent [19]
Yamamoto et al.

[11] 4,212,697
[45] Jul. 15, 1980

[54] PROCESS FOR PRODUCING GLASS FIBER-REINFORCED RESIN MOLDED SHEETS

[75] Inventors: Osamu Yamamoto; Yoshiki Matsumoto; Hiromi Yamada; Keishin Takehara, all of Chiba, Japan

[73] Assignee: Nitto Boseki Co., Ltd., Fukeshima, Japan

[21] Appl. No.: 950,872

[22] Filed: Oct. 12, 1978

Related U.S. Application Data

[63] Continuation-in-part of Ser. No. 825,511, Aug. 17, 1977, abandoned.

[30] Foreign Application Priority Data

Sep. 22, 1976 [JP] Japan .............................. 51/114119
Mar. 22, 1978 [JP] Japan .............................. 53/32625

[51] Int. Cl.$^2$ .............................................. B32B 17/04
[52] U.S. Cl. .............................. 427/389.8; 427/386; 264/128
[58] Field of Search ............... 427/385 A, 386, 390 A; 156/296

[56] References Cited

U.S. PATENT DOCUMENTS 3,136,681 6/1964 Johnston ........................ 428/268 X
3,776,751 12/1973 Davis et al. ................... 427/390 A
4,006,272 2/1977 Sakaguchi et al. ................. 428/268

FOREIGN PATENT DOCUMENTS 44-15909 7/1969 Japan.

*Primary Examiner*—James R. Hoffman
*Attorney, Agent, or Firm*—Sughrue, Rothwell, Mion, Zinn and Macpeak

[57] ABSTRACT

A process for producing a glass fiber-reinforced molded sheet by impregnating glass fibers with a resin syrup and thereafter hardening the resin syrup with which the glass fibers are impregnated, wherein the resin syrup is 20 to 35% by weight vinyl aromatic hydrocarbon and comprises 25 to 50 parts by weight acrylonitrile-vinyl aromatic hydrocarbon copolymer and 75 to 50 parts by weight acrylic acid, methacrylic acid, methacrylic acid ester, acrylic acid ester or mixtures thereof, the copolymer comprising 10 to 50 parts by weight acrylonitrile and 90 to 50 parts by weight vinyl aromatic hydrocarbon and having a viscosity average molecular weight of 30,000 to 100,000. A process for producing a glass fiber-reinforced resin molded sheet is also disclosed which is more effective than the aforesaid process wherein the acrylonitrile-vinylaromatic copolymer is modified with 0.05 to 0.2 part by weight of a polyfunctional monomer based on a total of 100 parts by weight of acrylonitrile and vinyl aromatic hydrocarbon.

9 Claims, No Drawings

PROCESS FOR PRODUCING GLASS FIBER-REINFORCED RESIN MOLDED SHEETS

CROSS-REFERENCE TO RELATED APPLICATIONS

This is a continuation-in-part application of U.S. patent application Ser. No. 825,511, filed Aug. 17, 1977, and now abandoned.

BACKGROUND OF THE INVENTION

1. Field of the Invention

This invention relates to a process for producing a transparent glass fiber-reinforced resin molded sheet which is especially suitable as a roofing sheet, a sidewall sheet, etc., of a greenhouse. The sheet is prepared from a resin composed mainly of acrylic acid, methacrylic acid or an ester thereof, typified by methyl methacrylate.

In this specification, the term "acrylate" is used collectively to refer to both acrylic and methacrylic acid as well as esters thereof.

2. Description of the Prior Art

Molded articles from glass fiber-reinforced resins obtained by impregnating glass fibers with a resin composed mainly of methyl methacrylate and curing the resin have frequently been used outdoors as sheet-like molded articles. A technique is known to obtain a transparent molded article of a fiber glass-reinforced resin by bringing the refractive index of the resin into agreement with that of the glass forming the glass fibers. According to one example of such a technique, methyl methacrylate is copolymerized with a vinyl aromatic hydrocarbon such that the refractive index of the methyl methacrylate polymer (about 1.49) is adjusted with the high refractive index of the vinyl aromatic hydrocarbon polymer (about 1.58 to 1.60) to bring the refractive index of the resin into agreement with that of glass fibers (1.515 to 1.520). See, for example, R. B. Beevers, Trans. Faraday Soc., 58, 1465 (1962). However, the rate of polymerization of the vinyl aromatic hydrocarbon is slow and, as a result, a viscous solution or a resin syrup obtained by partial copolymerization of the two monomers and with which the glass fibers are to be impregnated takes too long to cure, which has been a principal drawback in methods of producing glass fiber-reinforced resin products efficiently.

Japanese Patent Publication No. 15909/1969 discloses a resin syrup for use in preparing transparent moldings or laminates. The resin syrup is a composition of an acrylonitrile-styrene copolymer containing 17 to 40 mol% acrylonitrile dissolved in methyl methacrylate monomer or a monomer mixture containing methyl methacrylate. The viscosity of the resin syrup is 0.1 to 50 poise at 20° C.

SUMMARY OF THE INVENTION

An object of this invention is to provide a process for producing glass fiber-reinforced resin molded sheets having high light transmission properties and excellent mechanical properties and surface smoothness in an extremely short period without impairing the transparency of the sheets.

DETAILED DESCRIPTION OF THE INVENTION

As mentioned above, one feature of this invention is to adjust the refractive index of the resin to approximately that of glass. Another feature is to use a so-called polymer-monomeric syrup which is a polymer dissolved in an acrylate monomer so as to cure the resin syrup in a short period of time after impregnating the glass fibers therewith.

By using as the polymer an acrylonitrile-vinyl aromatic hydrocarbon copolymer which is typically an acrylonitrile-styrene copolymer having a viscosity average molecular weight of 30,000 to 100,000 or an acrylonitrile-vinyl aromatic hydrocarbon copolymer which is modified with a small amount of a polyfunctional monomer, the solubility parameter of the polymer is made equal to or larger than the solubility parameter of acrylic acid or its ester. This prevents phase separation between the dissolved polymer and the polymer produced by polymerization of the acrylate. Thus, it eliminates light scattering caused by any difference in the refractive indices due to such phase separation. As a result, a transparent glass fiber-reinforced resin molded sheet having excellent light transmission properties, mechanical properties and surface smoothness can be produced.

In order to produce a glass fiber-reinforced resin molded sheet having especially good transparency by the process of this invention, it is necessary to use a polymer having a solubility parameter, as calculated from the Small equation, of at least 9.30. It has been confirmed, however, that a practical transparency for plastic sheeting used in a greenhouse can be obtained even with a polymer having a calculated solubility parameter of about 9.25.

The calculated solubility parameters of an acrylonitrile-styrene copolymer which are a typical example of the acrylonitrile-vinyl aromatic hydrocarbon copolymer to be used in this invention are 9.25, 9.35 and 9.65 as the acrylonitrile content therein increases from 10 to 20 to 30% by weight. Accordingly, an acrylonitrile content of 10% by weight is sufficient to impart a practical transparency to the molded resin sheet.

The acrylonitrile content of the copolymer should not exceed 50% by weight, because the sequence of the chain length of the acrylonitrile unit will otherwise increase and intramolecular cyclization will then occur in the curing step which impairs the transparency of the final product. What is more at higher acrylonitrile contents, the styrene content of the resin inevitably decreases and this narrows the range within which the refractive index of the polymer can be adjusted, thus making such adjustment difficult to achieve.

Regarding the copolymer concentration, if the concentration of the acrylonitrile-vinyl aromatic hydrocarbon copolymer in the resin syrup is more than 50% by weight, the viscosity of the resin syrup becomes too high and this makes the syrup difficult to handle. Therefore, resin syrups having too high a copolymer concentration should be avoided. However, in order to bring the refractive index of the cured resin near to the refractive index of the glass fibers (1.515 to 1.520) and avoid opaqueness, the resin syrup must contain 20 to 35% by weight of the vinyl aromatic hydrocarbon content recalling that the vinyl aromatic hydrocarbon content is responsible for the refractive index adjustment. A resin syrup having the acrylonitrile-vinyl aromatic hydrocarbon compolymer dissolved in an acrylate and which has 20 to 35% by weight of the vinyl aromatic hydrocarbon provides a final molded product having a refractive index in the range from 1.510 to 1.530. If glass fibers are impregnated with such resin syrup, the resulting glass fiber-reinforced resin product has extremely high transparency.

Using an acrylonitrile-styrene copolymer as a typical example of the acrylonitrile-vinyl aromatic hydrocarbon copolymer used in this invention, a resin syrup obtained by dissolving an acrylonitrile-styrene copolymer (50:50 monomer ratio by weight) at a concentration of 40% by weight in methyl methacrylate, the concentration of styrene is 20% by weight and the product has a refractive index of about 1.510. With a resin syrup containing 25% by weight acrylonitrile-styrene copolymer (10:90 monomer ratio by weight), the concentration of styrene is 23% by weight and the product has a refractive index of about 1.513. Using a resin syrup containing a 50% by weight acrylonitrile-styrene copolymer (30:70 monomer ratio), the concentration of styrene is 35% by weight and the product has a refractive index of about 1.528. It has been confirmed that a glass fiber-reinforced resin molded sheet from such resin syrups has a transparency especially suitable for use as the roofing sheets and sidewall sheets of a greenhouse.

A syrup resin containing a 50% by weight of an acrylonitrile-styrene copolymer (10:90 monomer ratio by weight), the concentration of styrene being 45% by weight, provides a product having a refractive index of 1.541. Such a syrup may be used to impregnate fibers of "E-glass" which has a high refractive index of 1.55, but the resulting glass fiber-reinforced resin molded sheet transmits poorly ultraviolet rays having a wavelength shorter than 390 m$\mu$, and what is more, its weatherability is low. Therefore, to satisfy the practical need that the final product be used especially as plastic sheeting in a greenhouse, the resin syrup should not contain more than 35% by weight styrene.

As will be described hereinafter, the resin syrup having an acrylonitrile-vinyl aromatic hydrocarbon copolymer dissolved in acrylate must have a viscosity in the range from 3 to 7 poises at room temperature in order to achieve effective impregnation of glass fibers. To achieve this viscosity, the resin syrup must contain 25 to 50% by weight of an acrylonitrile-vinyl aromatic hydrocarbon copolymer having a viscosity average molecular weight ranging from 30,000 to 100,000.

Accordingly, the resin syrup used in the process of this invention contains 20 to 35% by weight of a vinyl aromatic hydrocarbon and is prepared by dissolving 25 to 50 parts by weight of an acrylonitrile-vinyl aromatic hydrocarbon copolymer consisting of 10 to 50 parts by weight of acrylonitrile and 90 to 50 parts by weight of a vinyl aromatic hydrocarbon in 75 to 50 parts by weight of acrylic acid, methacrylic acid, its ester or a mixture thereof and the copolymer may be modified with a small amount of a polyfunctional monomer.

Hence, the composition of the copolymer used in the process of this invention is determined both by the content of the vinyl aromatic hydrocarbon and the concentration of the copolymer in the resin syrup.

According to the process of this invention, glass fibers are impregnated with the resin syrup prepared in the manner described above, and thereafter subjected to curing. In this process, the resin syrup has a viscosity lower than 3 poises at room temperature, the syrup will flow out of the glass fibers making it difficult to give the final product a uniform thickness. If the viscosity of the syrup is higher than 7 poises, not only is it difficult to remove air bubbles from impregnated glass fibers but the glass fibers are not sufficiently bonded with the resin to provide a molded sheet of satisfactorily high strength. Therefore, according to this invention, to keep the viscosity of the resin syrup in the range from 3 to 7 poises and control the refractive index of the syrup in the range from 1.510 to 1.530, the viscosity average molecular weight of the acrylonitrile-vinyl aromatic hydrocarbon copolymer should be in the range from about 30,000 to 100,000, thus making the copolymer highly soluble in the resin syrup as well as maintaining the concentration of the copolymer in the syrup at 25 to 50% by weight.

If the acrylonitrile-vinyl aromatic hydrocarbon copolymer has a viscosity average molecular weight of less than 30,000, the characteristics as "a polymer" are not exhibited by such copolymer, with the result that the molded sheet has low strength. If the viscosity average molecular weight of the copolymer is higher than 100,000, several disadvantages will result: first, it takes a long time to dissolve the copolymer in the acrylate; the copolymer dissolves so poorly that it is difficult to obtain a homogeneous solution of the resin syrup and the molded sheet has decreased apparent strength; the resin syrup with which glass fibers have been impregnated and which is being cured has so high a monomer content that polymerization is accompanied with high volume shrinkage to provide a molded sheet wherein glass fibers appear on the rough surface to become visible; such high monomer content in the resin syrup results in a large quantity of heat being generated during curing, and, as a result, the curing temperature must be maintained low and the curing time prolonged.

Therefore, for the purpose of eliminating these defects and minimizing the quantity of heat generated in the course of curing the glass fibers which have been impregnated with the resin syrup to thereby positively increase the curing temperature and hence the molding rate, the resin syrup should contain an acrylonitrile-vinyl aromatic hydrocarbon copolymer whose viscosity average molecular weight is within the range from 30,000 to 100,000 that allows the solubility of said copolymer to be maintained at a high level.

Suitable vinyl aromatic hydrocarbons which can be used in this invention are hydrocarbons in which one vinyl group is directly bonded to the aromatic ring; vinyl aromatic hydrocarbons such as styrene, $\alpha$-methyl styrene, vinyltoluene and vinylxylene which are copolymerizable with acrylonitrile may be used.

The acrylate is, for example, acrylic acid, methacrylic acid, ethyl acrylate, butyl methacrylate, hydroxyethyl acrylate, methyl methacrylate and the like. These monomers may be used either individually or as an admixture of two or more thereof. Methyl methacrylate is the most suited for practical application.

As described hereinbefore, according to this invention, glass fibers are impregnated with a resin syrup prepared by dissolving 25 to 50 parts by weight of an acrylonitrile-vinyl aromatic hydrocarbon copolymer consisting of 10 to 50 parts by weight of acrylonitrile and 90 to 50 parts by weight of a vinyl aromatic hydrocarbon in about 75 to 50 parts by weight of acrylic acid or its ester or a mixture thereof. Therefore, the vinyl aromatic hydrocarbon that will otherwise retard the curing of the resin syrup with which glass fibers have been impregnated is already in a polymeric state prior to curing; hence, as compared with the conventional monomer-prepolymerized resin syrup, the rate of curing the resin syrup of this invention with which the glass fibers have been impregnated can be sufficiently increased to boost the productivity of the process on an industrial scale significantly.

It is apparent to those skilled in the art that the curing time for the resin syrup with which glass fibers are impregnated can be shortened by using means commonly used to promote the curing of resins. For example, by the addition of a catalyst such as benzoyl peroxide, acetyl peroxide and t-butylperoxypivalate, or by raising the temperature of the syrup to about 50° to 80° C., or by using a chain transfer agent to reduce the molecular weight of the copolymer so as to achieve high concentration syrup, or by adding a polyfunctional monomer to the resin syrup to give higher gelatin effect in the course of curing.

Useful chain transfer agents that can be generally used in this invention include alkyl mercaptans such as n-dodecyl mercaptan, isopropyl mercaptan and n-butyl mercaptan, aryl mercaptans such as thiophenol, thiocresol and thionaphthol and sulfur compounds containing an active hydrogen such as thioglycolic acid and esters thereof. The effective amount of the chain transfer agent is about 0.1 to 1.0 part by weight per 100 parts by weight of the changed monomer to obtain the copolymer having a viscosity average molecular weight ranging from 30,000 to 100,000.

Examples of suitable polyfunctional monomers which can be employed in this invention include ethylene glycol dimethacrylate, diethylene glycol dimethacrylate, trimethylolpropane trimethacrylate, ethylene dimethacrylate, ethylene glycol dimethacrylate, ethylene glycol diacrylate, trimethylolethane triacrylate, 1,3-butylene dimethacrylate, glycidyl methacrylate, divinylbenzene, triallyl cyanurate and triallyl isocyanurate. Of these compounds, 1,3-butylene dimethacrylate, ethylene dimethacrylate and trimethylolpropane trimethacrylate are especially effective for increasing the curing rate.

If the transparency of a molded sheet is not considered, addition of up to about 5% by weight of these polyfunctional monomers based on the resin syrup shortens the curing time as the amount of the agent increases, with no adverse effect on the mechanical properties of the molded sheet. But if the amount of the polyfunctional monomer exceeds about 5% by weight, the molded sheet will become brittle. It is, therefore, necessary to restrict the maximum amount of the polyfunctional monomer to be added to about 5% by weight.

It has been confirmed that in general, the time of curing a resin syrup to which about 5% by weight of a crosslinking agent of this type is added is reduced to about ⅜ to ½ of the time required for curing a resin syrup free of such agent. However, if more than about 2% by weight of such polyfunctional monomer is used, there is a tendency to impair the transparency of the resulting molded sheet. Therefore, for the purpose of producing a molded sheet having excellent transparency, it is preferred not to use more than about 2% by weight of the polyfunctional monomer.

As described hereinabove, in one embodiment of this invention, acrylonitrile-vinyl aromatic hydrocarbon copolymer is not modified. According to another embodiment of the invention, however, the acrylonitrile-vinyl aromatic hydrocarbon copolymer that is used to make the resin syrup is modified with 0.05 to 0.2 part by weight of a polyfunctional monomer based on a total of 100 parts by weight of acrylonitrile and vinyl aromatic hydrocarbon. Using the modified copolymer results in a more efficient process than the use of the unmodified copolymer for reasons discussed below. Furthermore, a polyfunctional monomer as discussed above may be added to the resin syrup that contains such modified copolymer, and glass fibers are impregnated with the resin syrup, which is then cured to produce a molded sheet.

The unmodified acrylonitrile-vinyl aromatic hydrocarbon copolymer to be used in the invention or the modified acrylonitrile-vinyl aromatic hydrocarbon copolymer used in the invention can be prepared by any conventional method of polymerization such as suspension polymerization, emulsion polymerization, solution polymerization, or block polymerization. It is, however, necessary, that recovery of the desired copolymer by accompanied with removal of the impurities.

As expalined hereinbefore, if more than 2% by weight of a polyfunctional monomer is added to an unmodified copolymer containing resin syrup so as to shorten the curing time for the resin, the transparency of the resulting molded sheet is impaired. However, it is noteworthy that if the acrylonitrile-vinyl aromatic hydrocarbon copolymer is modified (i.e., reacted) with a small amount of a polyfunctional monomer, the polyfunctional monomer can be added to a resin syrup in an amount of up to 10% by weight based on the amount of resin syrup without substantially adversely affecting the transparency of the molded sheet obtained.

Thus, using a modified acrylonitrile-vinyl aromatic hydrocarbon copolymer makes it possible to add much more polyfunctional monomer to the resin syrup than when an unmodified acrylonitrile-vinyl aromatic hydrocarbon copolymer is employed and, as a result, good transparency can be obtained at a high curing rate. This is presumably because the addition of a polyfunctional monomer to the resin syrup with the unmodified copolymer readily causes phase separation between the dissolved unmodified copolymer and acrylate polymer which results on curing, thus producing impaired transparency, whereas such phase separation due to additional use of a polyfunctional monomer is inhibited using an acrylonitrile-vinyl aromatic hydrocarbon copolymer modified with a polyfunctional monomer.

The polyfunctional monomers specified hereinbefore for use as a cross-linking agent can also be used as the modifier for preparing the modified acrylonitrile-vinyl aromatic hydrocarbon copolymer. The polyfunctional monomers used to modify the resin and that used as a cross-linking agent may be the same or different.

The modified acrylonitrile-vinyl aromatic hydrocarbon copolymer that is modified with a polyfunctional monomer and having a viscosity average molecular weight in the range from 30,000 to 100,000 may be prepared as follows.

0.1 to 0.2 part by weight of a polyfunctional monomer based on a total of 100 parts by weight of acrylonitrile and vinyl aromatic hydrocarbon is added at the initial stage of polymerization, and the polymerization reaction is stopped to recover a modified acrylonitrile-vinyl aromatic hydrocarbon copolymer as the end-product at a polymerization conversion of about 30%. Alternatively, the polyfunctional monomer may be added to the reaction mixture of acrylonitrile and vinyl aromatic hydrocarbon after a polymerization conversion of 70 to 90% is reached and then the polymerization reaction is brought to a completion and the modified acrylonitrile-vinyl aromatic hydrocarbon copolymer is recovered.

If 0.05 to 0.1 part by weight of a polyfunctional monomer is used based on a total of 100 parts by weight of acrylonitrile and vinyl aromatic hydrocarbon, the monomer is preferably added at the initial stage of polymerization, which is then brought to a completion for recovery of the modified acrylonitrile-vinyl aromatic hydrocarbon copolymer.

According to the latter embodiment of this invention, the curing time may be shorter than when a resin syrup is prepared from an unmodified copolymer to which a polyfunctional monomer has been added, which leads to a significant increase in the productivity of the process.

If less than 0.05 part by weight of a polyfunctional monomer is added per 100 parts total by weight of acrylonitrile and vinyl aromatic hydrocarbon, the amount is not sufficient to prepare the desired modified acrylonitrile-vinyl aromatic hydrocarbon copolymer, whereas if more than 0.2 part by weight of the polyfunctional monomer is used, the molded sheet has low transparency. Accordingly, the copolymer is modified with the polyfunctional monomer in an amount ranging from 0.05 to 0.2 part by weight based on a total of 100 parts by weight of acrylonitrile-vinyl aromatic hydrocarbon.

Up to about 10% by weight of a polyfunctional monomer can be added to the resin syrup to shorten the curing time without damaging the transparency of the product. It has been confirmed as will be demonstrated in Examples 1 and 2 hereinafter that the degree to which the curing time can be shortened using modified acrylonitrile-vinyl aromatic hydrocarbon copolymer is even larger than can be achieved by adding a polyfunctional monomer to a resin syrup containing the unmodified copolymer.

If more than about 5% by weight of a polyfunctional monomer is used as a cross-linking agent, the molded sheet which is obtained becomes brittle as already discussed in connection with the use of an unmodified acrylonitrile-vinyl aromatic hydrocarbon copolymer. Therefore, it is suitable for the purpose of this invention that the amount of a polyfunctional monomer used as a cross-linking agent should not exceed a maximum of about 5% by weight based on the resin syrup.

To produce a glass fiber-reinforced resin molded sheet by the process described above in this invention, the relative proportion of glass fibers to the resin syrup is that which is commonly employed in the production of such glass fiber-reinforced resin molded products. In general, about 20 to 30 parts by weight of glass fibers per 100 parts by weight of the resin syrup is preferred to provide a molded sheet having good mechanical strength.

Conventionally used glass fibers can be employed in this invention. In general, a chopped strand of so-called "chemical glass" fibers having a relatively low refractive index of about 1.515 to 1.520 and containing alkali metal oxides can be used.

The following examples and comparative examples are provided to illustrate in detail the synthesis of the resin which forms the basis of the process of this invention as well as the various properties of the molded sheets obtained by curing a resin composition which comprises 1 part by weight of t-butylperoxypivalate per 100 parts by weight of such resin syrup as compared with the synthesis of a resin syrup using a conventional method and the properties of molded sheets obtained by curing the thus synthesized resin syrup. Unless otherwise indicated herein, all parts, percents, ratios and the like are by weight.

EXAMPLE 1

In accordance with Run No. 1 shown in Table 1 below, a monomer mixture of 10 parts by weight of acrylonitrile and 90 parts by weight of styrene, 0.1 part by weight of t-butylperoxypivalent as a polymerization initiator and 0.6 part by weight of n-dodecyl mercaptan as a chain transfer agent were charged into a reactor, and reacted at 60° C. to produce a prepolymer of acrylonitrile and styrene having a viscosity average molecular weight of 70,000.

To 25 parts by weight of the resulting prepolymer were added 75 parts by weight of methyl methacrylate and 0.05 part by weight of azobisisobutyronitrile as a polymerization initiator. These materials were reacted in a reactor to produce a resin syrup having a polymer content of 31 to 33% and a viscosity of 5.5 poises (25° C.) for use in this invention.

Then, a composition comprising 1 part by weight of t-butylperoxypivalate per 100 parts by weight of the resin syrup was poured into a sheet-forming mold, and heated at about 65° C. for 16 minutes to produce a resin cured sheet having a thickness of about 1 mm.

Repetition of these procedures confirmed that the curing of the resin syrup completed in 15 to 17 minutes.

The resulting resin cured sheets were semitransparent but sufficiently transparent that they could be used as transparent sheets in practical application. The sheets had a light transmittance of 82 to 83% (at 350 mμ), a refractive index of 1.513, a bending strength of 10 to 12 kg/mm$^2$ and a tensile strength of 5 to 7 kg/mm$^2$.

The proportions of the monomers used to form resin syrups and the characteristics of resin cured sheets in the above and subsequent experimental examples are summarized in Table 1 below.

EXAMPLES 2 TO 4

According to Run Nos. 2 to 4 in Table 1, a monomer mixture of acrylonitrile and styrene in the proportions indicated in Table 1, 0.1 part by weight of t-butylperoxypivalate as a polymerization initiator, and optionally 0.1 to 0.8 part by weight of n-dodecyl mercaptan as a chain transfer agent were charged into a reactor, where they were reacted at 60° C. to produce a prepolymer of acrylonitrile and styrene.

To 25 to 40 parts by weight of the prepolymer were added 75 to 60 parts by weight of methyl methacrylate and optionally 0.05 part by weight of azobisisobutyronitrile as a polymerization initiator. These materials were either reacted in a reactor or allowed to stand as a mixture to obtain resin syrups having the polymer contents and viscosities shown in Table 1.

Then, a composition comprising 1 part by weight of t-butylperoxypivalate per 100 parts by weight of the resin syrup was poured into a sheet-forming mold and heated at about 65° C. for each of the periods indicated in Table 1 below to produce resin cured sheets having a thickness of about 1 mm and very high transparency.

In these examples, the use of a polyfunctional monomer as a cross-linking agent that shortens the curing time for resin syrups has been omitted. However, as described hereinabove, the curing time can substantially be reduced by half, from 16 to 19 minutes to about 8 to 10 minutes, by using a suitable amount of such polyfunctional monomer.

As Table 1 demonstrates, the cured sheets of the resin syrup used in this invention have appreciably improved mechanical strength properties in comparison with the cured sheets obtained in the comparative experimental examples (conventional method) set forth below. In addition, the cured sheet of this invention is highly flexible and thus pliable when bent. Because of these characteristics, it can be used for designing cured plastic panels for a greenhouse which is one important outdoor application of a resin cured sheet of this kind. It will withstand a strong force that is applied to bend it during inserting or fitting operation. Hence, the glass fiber-reinforced resin cured sheet obtained by the process of this invention promises extremely high marketability.

COMPARATIVE EXAMPLES 1 TO 3

According to Run Nos. 5 to 7 in Table 2 below, a monomer mixture of methyl methacrylate and each of the vinyl aromatic hydrocarbons in the proportions defined in Table 2, 0.05 part by weight of azobisisobutyronitrile as a polymerization initiator and 0.6 part by weight of n-dodecyl mercaptan as a chain transfer agent were charged into a reactor, where they were reacted at 80° C. to produce a monomeric syrup having a viscosity average molecular weight of 50,000.

Then, a composition comprising 1 part by weight of t-butylperoxypivalate per 100 parts by weight of the monomeric syrup was poured into a sheet-forming mold in the same manner as in Examples 1 to 4, and heated at about 65° C. to produce resin cured sheets having a thickness of about 1 mm. As indicated in Table 2, the required curing time was more than 30 minutes for all runs. The bending strengths and tensile strengths of these sheets were inferior to those produced in Examples 1 to 4.

COMPARATIVE EXAMPLES 4 AND 5

Run Nos. 8 and 9 in Table 2 below show the transparency of molded sheets for the case that a homopolymer of styrene is used instead of the prepolymer of acrylonitrile and styrene. The homopolymer of styrene was prepared and mixed with methyl methacrylate in the proportions shown in the Table. These mixtures were reacted in a reactor to produce a resin syrup having a polymer content of 30 to 36%.

Then, a composition comprising 1 part by weight of t-butylperoxypivalate per 100 parts by weight of each resin syrup was poured into a sheet-forming mold and heated at about 65° C. to produce resin molded sheets having a thickness of about 1 mm.

As can be seen from the Table, although the required curing time could be shortened to about 15 to 20 minutes, but the resulting resin molded sheets were turbid without forming transparent products as intended by the process of this invention.

COMPARATIVE EXAMPLE 6

According to Run No. 10 in Table 2 below, 20 parts by weight of an acrylonitrile-styrene copolymer having a viscosity average molecular weight of 250,000 was dissolved in 80 parts by weight of methyl methacrylate with heating at about 40° C. to produce a resin syrup.

A resin molded sheet having a thickness of about 1 mm was prepared from the resin syrup in the same manner as used in Comparative Examples 4 and 5.

Due to high monomer content of the resin syrup, the resin molded sheet obtained had appreciably low surface smoothness and poor mechanical characteristics.

Table 1

| | Examples | | | |
|---|---|---|---|---|
| Run No. | Example 1 / 1 | Example 2 / 2 | Example 3 / 3 | Example 4 / 4 |
| I. Reaction Conditions | | | | |
| Resin Syrup Polymerization System | Polymer-Monomer | Polymer-Monomer | Polymer-Monomer | Polymer-Monomer |
| Composition of Resin syrup (wt %) | MMA:ST:AN 75:22.5:2.5 | MMA:ST:AN 75:20:5 | MMA:ST:AN 60:28:12 | MMA:ST:AN 70:24:6 |
| Acrylonitrile (AN) | 10 | 20 | 20 | 20 |
| Ethyl Acrylate (EA) | — | — | — | — |
| Vinyltoluene (VT) | — | — | — | — |
| Styrene (ST) | 90 | 80 | 70 | 80 |
| Methyl Methacrylate (MMA) | — | — | — | — |
| Azobisisobutyronitrile | — | — | — | — |
| t-Butylperoxypivalate | 0.1 | 0.1 | 0.1 | 0.1 |
| n-Dodecyl Mercaptan | 0.6 | 0.6 | 0.8 | 0.6 |
| Trimethylolpropane Trimethacrylate | — | — | — | 0.2 |
| Reaction Temperature (°C.) | 60 | 60 | 60 | 60 |
| Viscosity Average Molecular Weight of Polymer | 70,000 | 70,000 | 30,000 | 100,000 |
| II. Conditions of Preparing Resin Syrup | | | | |
| Prepolymer* | 25 | 25 | 40 | 30 |
| Methyl Methacrylate | 75 | 75 | 60 | 70 |
| Azobisisobutyronitrile | 0.05 | — | — | — |
| n-Dodecyl Mercaptan | — | — | — | — |
| Reaction Temperature (°C.) | 80 | 80 | — | — |
| III. Characteristics of Resin Syrup | | | | |
| Polymerization Conversion (%) | 31–33 | 25 | 40 | 30 |
| Viscosity (poise at 25° C.) | 5.5 | 4.5 | 6.5 | 6.0 |
| Curing Time (minutes) | 16 | 18 | 19 | 18 |
| IV. Characteristics of Molded Sheets | | | | |
| Transparency | Semi-transparent | Excellent | Excellent | Excellent |

Table 1-continued

| Run No. | Examples | | | |
|---|---|---|---|---|
| | Example 1 | Example 2 | Example 3 | Example 4 |
| Light Transmittance (%) at 350 mμ | 82-83 | 82-83 | 82-83 | 80-81 |
| Refractive Index | 1.513 | 1.511 | 1.516 | 1.514 |
| Bending Strength (kg/mm$^2$) | 10-12 | 12-13 | 10-12 | 11-12 |
| Tensile Strength (kg/mm$^2$) | 5-7 | 6-8 | 6-8 | 6-8 |

*Powdered prepolymer recovered by precipitation with methanol when the polymerization conversion reached 30%.

Table 2

| Run No. | Comparative Examples | | | | | |
|---|---|---|---|---|---|---|
| | Comparative Example 5 | Comparative Example 6 | Comparative Example 7 | Comparative Example 8 | Comparative Example 9 | Comparative Example 10 |
| I. Reaction Conditions | | | | | | |
| Resin Syrup Polymerization System | Monomeric | Monomeric | Monomeric | Polymer-Monomer | Polymer-Monomer | Polymer-Monomer |
| Composition of Resin Syrup (wt %) | MMA:ST 80:20 | MMA-ST:EA 60:20:20 | MMA-VT 80:20 | MMA:ST 70:30 | MMA-ST 80:20 | MMA:ST:AN 60:28:12 |
| Acrylonitrile (AN) | — | — | — | — | — | 20 |
| Ethyl Acrylate (EA) | — | 20 | — | — | — | — |
| Vinyltoluene (VT) | — | — | 20 | — | — | — |
| Styrene (ST) | 20 | 20 | — | — | — | — |
| Methyl Methacrylate (MMA) | 80 | 60 | 80 | 100 | 100 | 80 |
| Azobisisobutyronitrile | 0.05 | 0.05 | 0.05 | — | — | — |
| t-Butylperoxypivalate | — | — | — | 0.05 | 0.05 | — |
| n-Dodecyl Mercaptan | 0.6 | 0.6 | 0.6 | 0.6 | 0.6 | 0.1 |
| Trimethylolpropane Trimethacrylate | — | — | — | — | — | — |
| Reaction Temperature (°C.) | 80 | 80 | 80 | 100 | 100 | 60 |
| Viscosity Average Molecular Weight of Polymer | 50,000 | | | | | 250,000 |
| II. Conditions for Preparing Resin Syrup | | | | | | |
| Prepolymer* | | | | 30 | 20 | 20 |
| Methyl Methacrylate | | | | 70 | 80 | 80 |
| Azobisisobutyronitrile | | | | — | 0.05 | — |
| n-Dodecyl Mercaptan | | | | — | 0.3 | — |
| Reaction Temperature (°C.) | | | | — | 80 | — |
| III. Characteristics of Resin Syrup | | | | | | |
| Polymerization Conversion (%) | 34-36 | 34-36 | 34-36 | 30 | 34-36 | 20 |
| Viscosity (poise at 25° C.) | 5.0 | 4.8 | 5.2 | 4.5 | 5.5 | 7.5 |
| Curing Time (minutes) | 34 | 32 | 31 | 19 | 15 | 18 |
| IV. Characteristics of Molded Sheets | | | | | | |
| Transparency | Excellent | Excellent | Excellent | Turbid | Turbid | Excellent |
| Light Transmittance (%) at 350 mμ | 82-83 | 82-83 | 81-82 | — | — | 82-83 |
| Refractive Index | 1.512 | 1.511 | 1.512 | — | — | 1.505 |
| Bending Strength (kg/mm$^2$) | 10-12 | 10-12 | 9-11 | 9-11 | 9-11 | 8-10 |
| Tensile Strength (kg/mm$^2$) | 5-7 | 5-7 | 5-7 | 5-7 | 5-7 | 5-7 |

*Powdered prepolymer recovered by precipitation with methanol when the polymerization conversion reached 30 %.

Glass fibers were impregnated with the same resin syrups as produced in Examples 2 and 4, and the syrups were cured to prepare molded sheets. The time required to cure the resin syrups and the characteristics of the resulting glass fiber-reinforced resin molded sheets are described in the following examples.

EXAMPLES 5 AND 6

1 part by weight of t-butylperoxypivalate was added to 100 parts by weight of each of a resin syrup A obtained in Example 2 and a resin syrup B consisting of 90 parts by weight of the resin syrup obtained in Example 4 and 3 parts by weight of trimethylolpropane trimethacrylate. After thorough mixing, each mixture was used to impregnate 2-inch chopped strand of chemical glass fibers having a refractive index of 1.517 at a weight ratio of 1:4 (glass to resin syrup). Using a spacer to obtain a plastic sheet having a uniform thickness of 1 mm, the glass fibers were impregnated with resin syrup A and resin syrup B by heating at 65° C. for 18 minutes and 12 minutes, respectively. Post-curing was subsequently performed at 120° C. for 5 minutes to produce the desired glass fiber-reinforced resin molded sheets.

The characteristics of the resulting resin molded sheets are shown in Table 3 below. In the Table, the case resin syrup A was used is referred to as Example 5, and the case resin syrup B was used referred to as Example 6.

COMPARATIVE EXAMPLE 7

1 part by weight of t-butylperoxypivalate was added to 100 parts by weight of the monomeric resin syrup (MMA 80:ST 20) obtained in Comparative Example 1, and the materials were thoroughly mixed. The mixture was used to impregnate a 2-inch chopped strand of the same chemical glass fibers as employed in the Examples 5 and 6, with the weight ratio of glass to resin syrup being controlled at 1:4. While being controlled with a spacer having a thickness of 1 mm, the impregnated glass fibers were heated at 65° C. More than about 34 minutes were required to cure the resin syrup. Postcuring was performed at 120° C. for 5 minutes to produce a glass fiber-reinforced resin molded sheet having the characteristics shown in Table 3 below.

COMPARATIVE EXAMPLE 8

1 part of t-butylperoxypivalate was added to 100 parts by weight of the polymer-monomeric resin syrup produced in Comparative Example 6, and the materials were thoroughly mixed. In accordance with the procedure of Comparative Example 1, glass fibers were impregnated with the mixture, followed by heat curing at 56° C. for 34 minutes to produce a glass fiber-reinforced resin molded sheet.

The characteristics of the resulting resin molded sheet are shown in the column of "Comparative Example 8" of Table 3 below. Due to the disagreement of refractive index between the glass fibers and resin, the glass fibers were highly visible, the molded sheet had no transparency, and elevation of the glass fibers seriously damaged the smoothness of its surface.

The resin syrup prepared from a copolymer having a viscosity average molecular weight of as high as 250,000 in Comparative Example 8 had a high monomer content. If the curing temperature was increased to 65° C., it took only 23 minutes to complete curing, but too much foaming occurred in the course of curing and prevented the formation of a flat, transparent molded sheet. Accordingly, the temperature of 56° C. employed in Comparative Example 8 is the maximum for assuring desired curing without foaming.

Table 3

| Example in which Molded Sheet Was Prepared | Example 5 | Example 6 | Comparative Example 7 | Comparative Example 8 |
| --- | --- | --- | --- | --- |
| I. Characteristics of Molded Sheet | | | | |
| Transparency | Excellent | Excellent | Excellent | Glass Fibers Visible |
| Light Transmittance (%) at 350 mµ | 82-83 | 82-83 | 82-83 | 82-83 |
| Weatherability | No Discoloration | No Discoloration | No Discoloration | No Discoloration |
| Flexural Strength (kg/mm²) | 13-15 | 13-15 | 12-14 | 10-12 |
| Tensile Strength (kg/mm²) | 8-9 | 8-9 | 7-9 | 6-8 |
| Failure (deflection) in Bending (mm) | 12-14 | 12-14 | 6-8 | 12-14 |
| Permissible Curing Temperature (°C.) | 63 | ~65 | ~65 | ~56 |

In the examples and comparative examples given hereinabove, the various properties described were measured using the following methods.

Viscosity Average Molecular Weight of Polymer

Measured using an Ostwald capillary viscometer using benzene (25° C.) as a solvent for the methyl methacrylate/styrene system and dimethyl formamide (25° C.) as a solvent for the methyl methacrylate/styrene/acrylonitrile system.

Polymerization Conversion

Measured by a precipitation method using acetone (good solvent)-methanol (poor solvent).

Viscosity

Measured with a BM-type standard viscometer (a product of Tokyo Keiki K.K.) using a No. 2 rotor at 30 rpm.

Curing Time

The time required to cure a mixture of 100 parts of each of the resin syrup and 1 part of t-butylperoxypivalate was measured using a differential scanning calorimeter (DSC, a product of Perkin-Elmer Company) at 65° C.

Transparency

Evaluated by visual observation with the naked eye.

Light Transmittance

Transmittance of light at a wavelength of 350 mµ which was measured using a double-beam spectrophotometer (a product of Shimadzu Seisakusho K.K.).

Refractive Index

Measured at 25° C. using an Abbe refractormeter (a product of Shimadzu Seisakusho K.K.).

Bending Strength

Measured with a tensile tester ("Tensilon", a product of Toyo Baldwin Co., Ltd.) using a test piece having a width of 20 mm, span of 50 mm and a thickness of 1 mm.

Tensile Strength

Measured with a tensile tester ("Tensilon") using a dumbbell-shaped test piece having a width of 5 mm (central width of 3 mm), a length of 100 mm and a thickness of 1 mm.

Weatherability

A test sample was exposed to a weatherometer (a product of Suga Tester Co., Ltd.) for 400 hours, and then change in the color of a test sample was visually observed after exposure to a weatherometer (a product of Suga Tester Co., Ltd.) for 400 hours.

While the invention has been described in detail and with reference to specific embodiments thereof, it will be apparent to one skilled in the art that various changes and modifications can be made therein without departing from the spirit and scope thereof.

What is claimed is:

1. A process for producing a glass fiber-reinforced molded sheet by impregnating glass fibers with a resin syrup and thereafter hardening said resin syrup with which the glass fibers are impregnated, wherein said resin syrup is 20 to 35% by weight vinyl aromatic hydrocarbon and comprises 25 to 50 parts by weight acrylonitrile-vinyl aromatic hydrocarbon copolymer and 75 to 50 parts by weight acrylic acid, methacrylic acid, methacrylic acid ester, acrylic acid ester or mixtures thereof, said copolymer comprising 10 to 50 parts by weight acrylonitrile and 90 to 50 parts by weight vinyl aromatic hydrocarbon and having a viscosity average molecular weight of 30,000 to 100,000.

2. A process for producing a glass fiber-reinforced molded sheet by impregnating glass fibers with a resin syrup and thereafter hardening said resin syrup with which the glass fibers are impregnated, wherein said resin syrup is 20 to 35% by weight vinyl aromatic hydrocarbon and comprises 25 to 50 parts by weight acrylonitrile-vinyl aromatic hydrocarbon copolymer and 75 to 50 parts by weight acrylic acid, methacrylic acid, methacrylic acid ester, acrylic acid ester or mixtures thereof, said copolymer comprising 10 to 50 parts by weight acrylonitrile and 90 to 50 parts by weight vinyl aromatic hydrocarbon, having a viscosity average molecular weight of 30,000 to 100,000 and being modified with 0.05 to 0.2 part by weight of a polyfunctional monomer based on a total of 100 parts by weight acrylonitrile and vinyl aromatic hydrocarbon.

3. The method of claim 2, wherein said polyfunctional monomer is selected from the group consisting of ethylene glycol dimethacrylate, diethylene glycol dimethacrylate, trimethylolpropane trimethylacrylate, ethylene dimethacrylate, ethylene glycol dimethacrylate, ethylene glycol diacrylate, trimethylolethane triacrylate, 1,3-butylene dimethacrylate, glycidyl methacrylate, divinylbenzene, triallyl cyanurate and triallyl isocyanurate.

4. The method of claim 3, wherein said polyfunctional monomer is selected from the group consisting of 1,3-butylene dimethacrylate, methylenediacrylate and trimethylolpropane trimethacrylate.

5. The method of claim 1, wherein said resin composition additionally contains a polyfunctional monomer.

6. The method of claim 5, wherein said polyfunctional monomer is selected from the group consisting of ethylene glycol dimethacrylate, diethylene glycol dimethacrylate, trimethylolpropane trimethacrylate, ethylene dimethacrylate, ethylene glycol dimethacrylate, ethylene glycol diacrylate, trimethylolethane triacrylate, 1,3-butylene dimethacrylate, glycidyl methacrylate, divinylbenzene, triallyl cyanurate and triallyl isocyanurate.

7. The method of claim 1, wherein said resin syrup contains about 0.1 to 1.0 part by weight of a chain transfer agent per 100 parts by weight of said acrylic acid, methacrylic acid, acrylic acid ester, methacrylic acid ester or mixtures thereof.

8. The method of claim 2, wherein said resin syrup contains about 0.1 to 1.0 part by weight of a chain transfer agent per 100 parts by weight of said acrylic acid, methacrylic acid, acrylic acid ester, methacrylic acid ester or mixtures thereof.

9. The method of claim 2, wherein said resin syrup additionally contains a polyfunctional monomer in an amount of up to 10% by weight.

* * * * *